United States Patent
Zhou et al.

(10) Patent No.: US 10,359,554 B2
(45) Date of Patent: Jul. 23, 2019

(54) ATTACHING DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jinping Zhou, Beijing (CN); Lizhu Yu, Beijing (CN); Hongtao Ma, Beijing (CN); Jingxiao Lan, Beijing (CN); Guodong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 22 days.

(21) Appl. No.: 15/697,845

(22) Filed: Sep. 7, 2017

(65) Prior Publication Data
US 2018/0188431 A1    Jul. 5, 2018

(30) Foreign Application Priority Data
Jan. 5, 2017    (CN) .................... 2017 2 0013252 U

(51) Int. Cl.
*B32B 37/00* (2006.01)
*B32B 41/00* (2006.01)
*G02B 5/30* (2006.01)
*G01B 5/14* (2006.01)
*G01B 3/22* (2006.01)

(52) U.S. Cl.
CPC ........ *G02B 5/3033* (2013.01); *B32B 37/0053* (2013.01); *G01B 5/14* (2013.01); *B32B 41/00* (2013.01); *B32B 2457/20* (2013.01); *B32B 2457/202* (2013.01); *G01B 3/22* (2013.01)

(58) Field of Classification Search
CPC . B32B 37/0053; B32B 41/00; B32B 2457/20; B32B 2457/202; G01B 3/22; G01B 5/14; G02B 3/033
USPC ................. 156/351, 358, 378, 555
See application file for complete search history.

(56) References Cited

U.S. PATENT DOCUMENTS 5,061,337 A * 10/1991 Fraser .................... D04H 11/00
                                                          100/47

* cited by examiner

*Primary Examiner* — George R Koch
(74) *Attorney, Agent, or Firm* — Brooks Kushman P.C.

(57) ABSTRACT

An attaching device includes: a first attaching roller, a second attaching roller, a first distance measurement instrument, and a second distance measurement instrument. The first distance measurement instrument is to measure a distance between a first position of the first attaching roller and a second position of the second attaching roller. The second distance measurement instrument is to measure a distance between a third position of the first attaching roller and a fourth position of the second attaching roller. A straight line defined by the first position and the third position is parallel to an axial line of the first attaching roller, and a straight line defined by the second position and the fourth position is parallel to an axial line of the second attaching roller.

12 Claims, 3 Drawing Sheets

ATTACHING DEVICE

CROSS-REFERENCE TO RELATED APPLICATION

This application claims priority to Chinese patent application No. 201720013252.7 filed on Jan. 5, 2017, which is incorporated herein by reference in its entirety.

TECHNICAL FIELD

The present disclosure is related to the field of displaying technology, and in particular to an attaching device.

BACKGROUND

An attaching device is used to attach thin films to surfaces of various devices. For example, a polarizer attaching device is used to attach a polarizer to a display substrate of a display panel. During operation, it is usually needed to measure the attaching device with a feeler gauge. However, the measurement process is complicated.

SUMMARY

In order to solve the above problems in the related art that when the attaching device is measured with the feeler gauge, the measurement process is complicated, one embodiment of the present disclosure provides an attaching device. The technical solutions are as follows.

An attaching device is provided and includes: a first attaching roller, a second attaching roller, a first distance measurement instrument, and a second distance measurement instrument. The first distance measurement instrument is configured to measure a distance between a first position of the first attaching roller and a second position of the second attaching roller. The second distance measurement instrument is configured to measure a distance between a third position of the first attaching roller and a fourth position of the second attaching roller. A straight line defined by the first position and the third position is parallel to an axial line of the first attaching roller, and a straight line defined by the second position and the fourth position is parallel to an axial line of the second attaching roller.

Further, the first distance measurement instrument includes a first end and a second end, and the second distance measurement instrument includes a third end and a fourth end. The first end is connected with the first position, the second end is connected with the second position, the third end is connected with the third position, and the fourth end is connected with the fourth position.

Further, the first end and the third end are located at the axial line of the first attaching roller.

Further, the first end and the third end are located at two ends of the first attaching roller.

Further, the second end and the fourth end are located at the axial line of the second attaching roller.

Further, the second end and the fourth end are located at two ends of the second attaching roller.

Further, the attaching device further includes a lower support. The second attaching roller includes a second support and a second roller rotatably connected with the second support, and the second support is connected with the lower support.

Further, the second attaching roller further includes a first movable plate pivotally connected with the second support, and a second movable plate pivotally connected with the second support, the second position of the second attaching roller is at the first movable plate, the fourth position of the second attaching roller is at the second movable plate. When the first movable plate is rotated to a first preset position, the second end of the first distance measurement instrument abuts against the second position at the first movable plate. When the second movable plate is rotated to a second preset position, the third end of the second distance measurement instrument abuts against the fourth position at the second movable plate.

Further, the first movable plate is parallel to the axial line of the second attaching roller, and the second movable plate is parallel to the axial line of the second attaching roller.

Further, the attaching device further includes an upper support. The first attaching roller includes a first support and a first roller rotatably connected with the first support, and the first support is connected with the upper support.

Further, the first attaching roller further includes a first fixed support connected with the first support, and a second fixed support connected with the first support, the first position of the first attaching roller is at the first fixed support, and the third position of the first attaching roller is at the second fixed support. The first fixed support is connected with the first distance measurement instrument and the second fixed support is connected with the second distance measurement instrument.

Further, the first distance measurement instrument includes a dial gauge, and the second distance measurement instrument includes a dial gauge.

Further, the first distance measurement instrument includes a first end and a second end, and the second distance measurement instrument includes a third end and a fourth end. The first end is connected with the first position, the second end is movable relative to the second position, the third end is connected with the third position, and the fourth end is movable relative to the fourth position.

Further, the attaching device further includes a lower support. The second attaching roller includes a second support and a second roller rotatably connected with the second support, and the second support is connected with the lower support.

Further, the second attaching roller further includes a first movable plate and a second movable plate, the second position of the second attaching roller is at the first movable plate, the fourth position of the second attaching roller is at the second movable plate. The first movable plate is rotatably connected with the second support through a rotary shaft, and the rotary shaft has an axial line which is substantially perpendicular to a surface of the first movable plate. The second movable plate is rotatably connected with the second support through another rotary shaft, and the another rotary shaft has an axial line which is substantially perpendicular to a surface of the second movable plate.

Further, the first movable plate is rotated between a working position and a retracted position of the first movable plate, and the second movable plate is rotated between a working position and a retracted position of the second movable plate.

Further, the second attaching roller is disposed horizontally, and the first attaching roller is capable of moving relative to the second attaching roller.

Beneficial effects of the technical solutions of one embodiment of the present disclosure are as follow.

The first distance measurement instrument is used to measure the distance between the first position and the second position, and the second distance measurement instrument is used to measure the distance between the third position and the fourth position, and then whether the two attaching rollers are parallel to each other is determined according to whether the above two distances are equal, thereby solving the problem in the related art that the measuring process is complicated. Thus, the attaching device of one embodiment of the present disclosure can be measured easily and quickly.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

FIG. 2-1 is a schematic view of another attaching device according to an embodiment of the present disclosure;

FIG. 2-2 is a schematic view of a first distance measurement instrument, a first movable plate and a first fixed support of the attaching device shown in FIG. 2-1;

FIG. 2-3 is a perspective view of the structure shown in FIG. 2-2;

FIG. 2-4 is another perspective view of the structure shown in FIG. 2-2.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

An attaching device in the related art includes a first attaching roller, a second attaching roller, an upper support and a lower support. The first attaching roller is connected with the upper support. The second attaching roller is connected with the lower support. The lower support may be placed on the ground. The first attaching roller and the second attaching roller both are cylindrical. An axial line of the second attaching roller is usually parallel to the horizontal plane. The upper support connected with the first attaching roller is movable, and is capable of driving the first attaching roller to move, so as to complete film attachment. After the first attaching roller is mounted to the upper support, in order to ensure that the attached film is flat, it is needed to use a feeler gauge to measure distances at a variety of positions between the first attaching roller and the second attaching roller to determine whether these distances are equal, so as to determine whether the first attaching roller and the second attaching roller are parallel to each other. The measurement process includes: inserting the feller gauge into a to-be-measured gap (i.e., a gap between the two attaching rollers), and then pulling back and forth the feeler gauge. When the operator feels a slight resistance at one position, it indicates that a value of a gap at the one position is close to a number indicated at the feeler gauge. When the resistance is to large or too small during the pulling process, it indicates that a value of a gap at one position is smaller or greater than a number indicated at the feeler gauge. After obtaining a measurement result, the first attaching roller may be adjusted according to the measurement result.

In the process of realizing the present disclosure, the inventor discovers that there are at least the following problems in the related art: when the attaching device is measured with a feeler gauge, the measurement process is complicated.

In order to solve the above problem, one embodiment of the present disclosure provides an attaching device.

Figure 1:
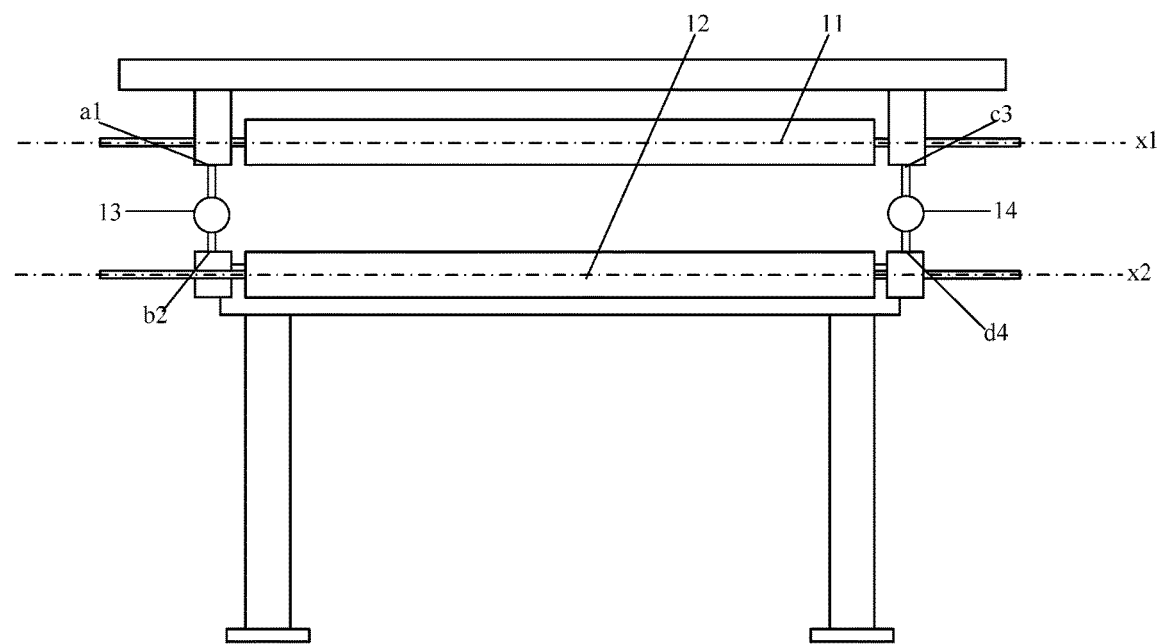
FIG. 1 is a schematic view of an attaching device according to an embodiment of the present disclosure.

FIG. 1 is a schematic view of an attaching device according to an embodiment of the present disclosure. The attaching device includes a first attaching roller 11, a second attaching roller 12, and two distance measurement instruments which include a first distance measurement instrument 13 and a second distance measurement instrument 14.

The first distance measurement instrument 13 is to measure a distance between a first position a1 of the first attaching roller 11 and a second position b2 of the second attaching roller 12. The second distance measurement instrument 14 is to measure a distance between a third position c3 of the first attaching roller 11 and a fourth position d4 of the second attaching roller 12. A straight line defined by the first position a1 and the third position c3 is parallel to an axial line x1 of the first attaching roller 11. A straight line defined by the second position b2 and the fourth position d4 is parallel to an axial line x2 of the second attaching roller 12.

As described above, in the attaching device of one embodiment of the present disclosure, the first distance measurement instrument is used to measure the distance between the first position and the second position, and the second distance measurement instrument is used to measure the distance between the third position and the fourth position, and then whether the two attaching rollers are parallel to each other is determined according to whether the above two distances are equal, thereby solving the problem in the related art that the measuring process is complicated. Thus, the attaching device of one embodiment of the present disclosure can be measured easily and quickly.

Figures 1, 2:
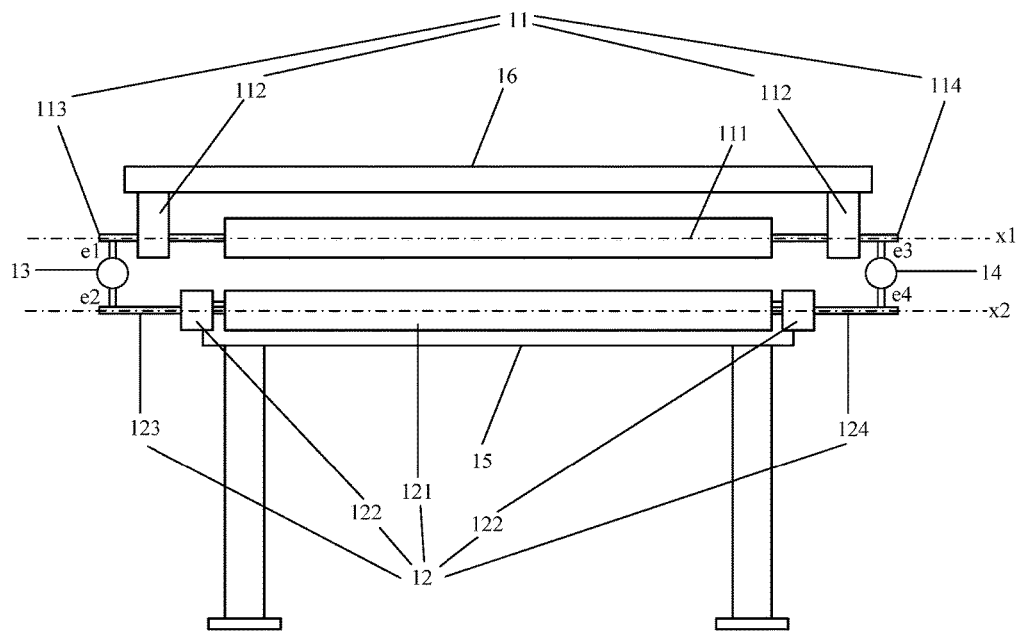
Figure 2:
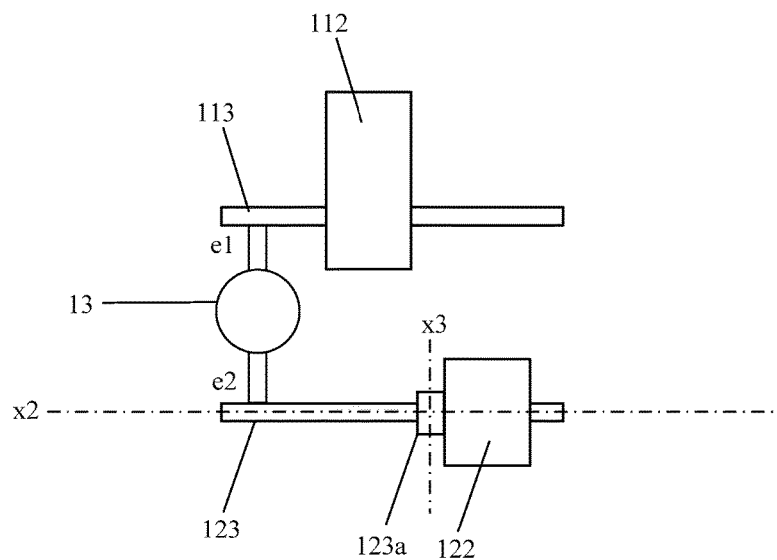

Further, referring to FIG. 2-1 which is a schematic view of another attaching device according to an embodiment of the present disclosure. On the basis of the attaching device shown in FIG. 1, more preferred components are added to the attaching device shown in FIG. 2-1, thereby providing better performance.

Optionally, the first distance measurement instrument 13 has a first end e1 and a second end e2, and the second distance measurement instrument 14 has a third end e3 and a fourth end e4. The first end e1 is connected with the first position, the second end e2 is connected with the second position, the third end e3 is connected with the third position, and the fourth end e4 is connected with the fourth position.

Optionally, the first end e1 and the third end e3 are located at an axial line x1 of the first attaching roller 11. The second end e2 and the fourth end e4 are located at an axial line x2 of the second attaching roller 12. In this way, what is obtained and measured by the first distance measurement instrument 13 and the second distance measurement instrument 14 is a distance between the axial line of the first attaching roller 11 and the second attaching roller 12. This value, i.e., the distance between the axial line of the first attaching roller 11 and the second attaching roller 12, is convenient for recording and subsequent processing.

Optionally, the first end e1 and the third end e3 are located at two ends of the first attaching roller 13. This make is easy to connect the first attaching roller 11 with the first distance measurement instrument 13 and the second distance measurement instrument 14.

Optionally, the second end e2 and the fourth end e4 are located at two ends of the second attaching roller 14. This make is easy to connect the second attaching roller 12 with the first distance measurement instrument 13 and the second distance measurement instrument 14.

Optionally, the attaching device further includes a lower support 15, the second attaching roller 12 includes a second support 122 and a second roller 121 rotatably connected with the second support 122. The second support 122 is connected with the lower support 15.

Optionally, the second attaching roller 12 further includes a first movable plate 123 pivotally connected with the second support 122, and a second movable plate 124 pivotally connected with the second support 122. The second position of the second attaching roller 12 is at the first movable plate 123. The fourth position of the second attaching roller 12 is at the second movable plate 124.

When the first movable plate 123 is rotated to a first preset position, the second end e2 of the first distance measurement instrument 13 abuts against the second position at the first movable plate 123.

When the second movable plate 124 is rotated to a second preset position, the third end e3 of the second distance measurement instrument 14 abuts against the fourth position at the second movable plate 124.

Optionally, the first movable plate 123 is parallel to the axial line x2 of the second attaching roller 12, and the second movable plate 124 is parallel to the axial line x2 of the second attaching roller 12.

Optionally, the attaching device further includes an upper support 16, the first attaching roller 11 includes a first support 112 and a first roller 1211 rotatably connected with the first support 112. The first support 112 is connected with the upper support 16.

Optionally, the first attaching roller 11 further includes a first fixed support 113 connected with the first support 112, and a second fixed support 114 connected with the first support 112. The first position of the first attaching roller 11 is at the first fixed support 113, and the third position of the first attaching roller 11 is at the second fixed support 114. The first fixed support 113 is connected with the first distance measurement instrument 13, and the second fixed support 114 is connected with the second distance measurement instrument 14.

Figures 2, 3:
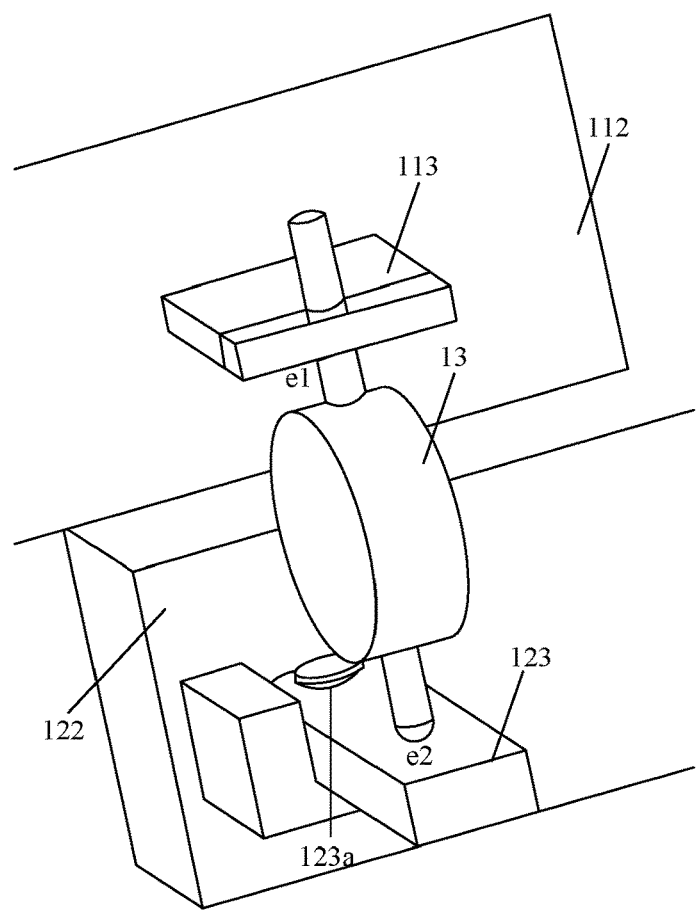
Figures 2, 3, 4:
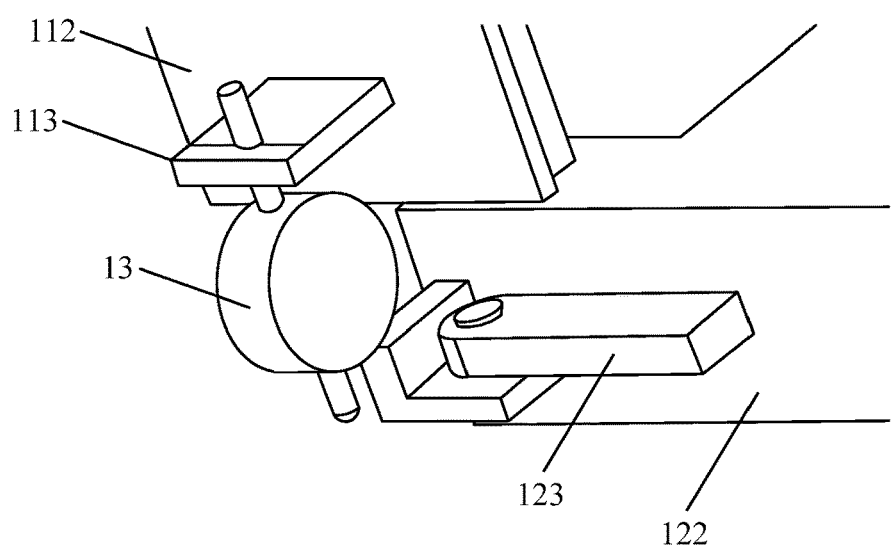

FIG. 2-2 is a schematic view of the first distance measurement instrument 13, the first movable plate 123 and the first fixed support 113 of the attaching device shown in FIG. 2-1. As shown in FIG. 2-2, the second end e2 of the first distance measurement instrument 13 abuts against the first movable plate 123, the first end e1 is connected with the first position at the first fixed support 113, and the first movable plate 123 may be rotatably connected with the second support 122 through a rotary shaft 123a. The rotary shaft 123a has an axial line x3 which is perpendicular to a surface of the first movable plate 123. As shown in FIG. 2-2, the surface of the first movable plate 123 is perpendicular to a straight line defined by the first end e1 and the second end e2. The first fixed support 113 may be connected with the first support 112. As shown in FIG. 2-3 which is a perspective view of the structure shown in FIG. 2-2. The same numbers in FIG. 2-3 and FIG. 2-2 represent the same or similar elements. FIG. 2-3 shows that the first movable plate 123 is rotated to the first preset position, i.e., a working position, and the second end e2 of the first distance measurement instrument 13 abuts against the first movable plate 123. FIG. 2-4 shows that the first movable plate 123 is rotated to a retracted position, i.e., a non-working position. After the position of the first attaching roller is adjusted, the first movable plate can be retracted, and then the first movable plate 123 does not affect normal operation of the attaching device. The same numbers in FIG. 2-3 and FIG. 2-4 represent the same or similar elements.

In addition, the second distance measurement instrument 14 may have the same or similar structure as the first distance measurement instrument 13 shown in FIG. 2-2, FIG. 2-3 and FIG. 2-4.

Optionally, the two distance measurement instruments 13-14 may be dial gauges. The dial gauge is a length measurement instrument which uses gears or a level to convert a general linear displacement (linear motion) to a rotary motion of a pointer so that the pointer points to graduations in a dial display. The accuracy of the dial gauge can reach 0.01 mm-0.001 mm. The usage of the dial gauge may refer to the related art and will not be explained here.

It should be noted that the attaching device of one embodiment of the present disclosure may be used to attach polarizer in the manufacturing process of thin film transistor-liquid crystal displays, to avoid occurrence of bubbles on the polarizer caused by that the two attaching rollers are not parallel to each other. Particularly when the attaching device is to attach a changed component to-be-attached (for example, attaching polarizer for different display panels), the first attaching roller may be adjusted by the two distance measurement instruments of the attaching device.

As described above, in the attaching device of one embodiment of the present disclosure, the first distance measurement instrument is used to measure the distance between the first position and the second position, and the second distance measurement instrument is used to measure the distance between the third position and the fourth position, and then whether the two attaching rollers are parallel to each other is determined according to whether the above two distances are equal, thereby solving the problem in the related art that the measuring process is complicated. Thus, the attaching device of one embodiment of the present disclosure can be measured easily and quickly.

In operation of the attaching device, it may be necessary to ensure that the first attaching roller is disposed horizontally. In the related art, a level gauge is usually placed on the first attaching roller and then the first attaching roller is adjusted (through an adjusting screw or the like which is disposed at a connection portion between the first attaching roller and the upper support and which is capable of adjusting the first attaching roller) according to a position of a bubble in the level gauge. In the above adjustment process, an operator needs to visually judge whether the bubble is in a middle position of the level gauge, and thus the adjustment accuracy is not high. Meanwhile, in the related art, whether two attaching rollers are parallel to each other is determined by the feeler gauge, and thus there is a larger error which may be about 0.2 mm. Further, in the related art, the levelness of the first attaching roller is first adjusted by the level gauge and then the spacing between the two attaching rollers are adjusted by the feeler gauge, and it is difficult to simultaneously adjust the levelness of the first attaching roller and the spacing between the two attaching rollers, and thus it takes a long time, i.e., 30 minutes.

Before operation of the attaching device of one embodiment of the present disclosure, an operator can rotate the first movable plate to the first preset position (i.e., working position) and rotate the second movable plate to the second preset position (i.e., working position) so that the second end of the first distance measurement instrument abuts against the second position at the first movable plate and the fourth end of the second distance measurement instrument abuts against the fourth position at the second movable plate. Then, the operator can adjust the position of the first attaching roller and view values shown at the two distance measurement instruments. When the values shown at the two distance measurement instruments are equal, it means that the first attaching roller and the second attaching roller are parallel to each other. Since the second attaching roller is disposed horizontally, the first attaching roller is also horizontally. Thus, the whole adjustment process is completed. When both of the distance measurement instruments are dial gauges and the accuracy of the dial gauges can reach 0.01 mm-0.001 mm, since whether the two attaching rollers are parallel to each other is determined by the dial gauges, the accuracy is much higher than that in the related art. Further, the adjustment process is simple and quick, and it takes a short time. In an experiment, the whole adjustment process takes about 6 minutes.

The forgoing descriptions are only optional embodiments of the present disclosure, and it should be noted that numerous improvements and substitutions may further be made by those skilled in the art without being departing from the principle of the present disclosure, and those improvements and substitutions shall fall into the scope of protection of the present disclosure.

What is claimed is:

1. An attaching device, comprising:
    a first attaching roller,
    a second attaching roller,
    a first distance measurement instrument, and
    a second distance measurement instrument,
    wherein the first distance measurement instrument is configured to measure a distance between a first position of the first attaching roller and a second position of the second attaching roller,
    wherein the second distance measurement instrument is configured to measure a distance between a third position of the first attaching roller and a fourth position of the second attaching roller, and
    wherein a straight line defined by the first position and the third position is parallel to an axial line of the first attaching roller, and a straight line defined by the second position and the fourth position is parallel to an axial line of the second attaching roller;
    wherein the first distance measurement instrument comprises a first end and a second end, and the second distance measurement instrument comprises a third end and a fourth end,
    wherein the first end is connected with the first position, the second end is connected with the second position, the third end is connected with the third position, and the fourth end is connected with the fourth position;
    the attaching device further comprising a lower support,
    wherein the second attaching roller comprises a second support and a second roller rotatably connected with the second support, and the second support is connected with the lower support;
    wherein the second attaching roller further comprises a first movable plate pivotally connected with the second support, and a second movable plate pivotally connected with the second support, the second position of the second attaching roller is at the first movable plate, the fourth position of the second attaching roller is at the second movable plate;
    when the first movable plate is rotated to a first preset position, the second end of the first distance measurement instrument abuts against the second position at the first movable plate, and
    when the second movable plate is rotated to a second preset position, the third end of the second distance measurement instrument abuts against the fourth position at the second movable plate.

2. The attaching device of claim 1, wherein the first end and the third end are located at the axial line of the first attaching roller.

3. The attaching device of claim 2, wherein the first end and the third end are located at two ends of the first attaching roller.

4. The attaching device of claim 1, wherein the second end and the fourth end are located at the axial line of the second attaching roller.

5. The attaching device of claim 4, wherein the second end and the fourth end are located at two ends of the second attaching roller.

6. The attaching device of claim 1, wherein the first movable plate is parallel to the axial line of the second attaching roller, and the second movable plate is parallel to the axial line of the second attaching roller.

7. The attaching device of claim 1, further comprising an upper support,
    wherein the first attaching roller comprises a first support and a first roller rotatably connected with the first support, and the first support is connected with the upper support.

8. The attaching device of claim 7, wherein the first attaching roller further comprises a first fixed support connected with the first support, and a second fixed support connected with the first support, the first position of the first attaching roller is at the first fixed support, and the third position of the first attaching roller is at the second fixed support,
    wherein the first fixed support is connected with the first distance measurement instrument and the second fixed support is connected with the second distance measurement instrument.

9. The attaching device of claim 1, wherein the first distance measurement instrument comprises a dial gauge, and the second distance measurement instrument comprises a dial gauge.

10. The attaching device of claim 1, wherein the second attaching roller is disposed horizontally, and the first attaching roller is capable of moving relative to the second attaching roller.

11. An attaching device, comprising:
    a first attaching roller,
    a second attaching roller,
    a first distance measurement instrument, and
    a second distance measurement instrument,
    wherein the first distance measurement instrument is configured to measure a distance between a first position of the first attaching roller and a second position of the second attaching roller,
    wherein the second distance measurement instrument is configured to measure a distance between a third position of the first attaching roller and a fourth position of the second attaching roller, and wherein a straight line defined by the first position and the third position is parallel to an axial line of the first attaching roller, and a straight line defined by the second position and the fourth position is parallel to an axial line of the second attaching roller;

wherein the first distance measurement instrument comprises a first end and a second end, and the second distance measurement instrument comprises a third end and a fourth end, wherein the first end is connected with the first position, the second end is movable relative to the second position, the third end is connected with the third position, and the fourth end is movable relative to the fourth position;

the attaching device further comprising a lower support, wherein the second attaching roller comprises a second support and a second roller rotatably connected with the second support, and the second support is connected with the lower support;

wherein the second attaching roller further comprises a first movable plate and a second movable plate, the second position of the second attaching roller is at the first movable plate, the fourth position of the second attaching roller is at the second movable plate, the first movable plate is rotatably connected with the second support through a rotary shaft, and the rotary shaft has an axial line which is substantially perpendicular to a surface of the first movable plate, and the second movable plate is rotatably connected with the second support through another rotary shaft, and the another rotary shaft has an axial line which is substantially perpendicular to a surface of the second movable plate.

12. The attaching device of claim 11, wherein the first movable plate is rotated between a working position and a retracted position of the first movable plate, and the second movable plate is rotated between a working position and a retracted position of the second movable plate.

\* \* \* \* \*